United States Patent
Hsieh et al.

(10) Patent No.: US 7,976,742 B2
(45) Date of Patent: Jul. 12, 2011

(54) MANUFACTURING PROCESS FOR OPTICAL THIN FILM WITH HIGH HARDNESS MADE BY INSERT MOLD TECHNOLOGY

(75) Inventors: Shan-Er Hsieh, Jhongli (TW);
Jyi-Horng Wang, Jhongli (TW);
Jen-Huai Chang, Jhongli (TW)

(73) Assignee: Entire Technology Co., Ltd., Taoyuan County (TW)

( * ) Notice: Subject to any disclaimer, the term of this patent is extended or adjusted under 35 U.S.C. 154(b) by 1308 days.

(21) Appl. No.: 11/546,333

(22) Filed: Oct. 12, 2006

(65) Prior Publication Data
US 2007/0160831 A1    Jul. 12, 2007

(30) Foreign Application Priority Data
Jan. 12, 2006 (TW) ................. 95101251 A

(51) Int. Cl.
*B29D 11/00* (2006.01)
(52) U.S. Cl. ........... 264/1.38; 264/1.7; 264/2.6; 264/2.7
(58) Field of Classification Search .................. 264/1.1, 264/1.36, 1.38, 1.7, 2.6, 2.7; 427/163.1; 425/808
See application file for complete search history.

*Primary Examiner* — Mathieu D. Vargot
(74) *Attorney, Agent, or Firm* — Alan Kamrath; Kamrath & Associates PA

(57) ABSTRACT

An optical thin film with high hardness is made by insert mold technology and manufacturing processes thereof. The optical thin film is applied on a surface of a plastic housing for increasing hardness of the plastic housing so as to prevent scratches. During manufacturing processes of the insert mold for producing a hard coating film, the step of hardening treatment is moved to the last step so as to avoid cracks on the optical thin film generated during the procedures. Thus, the yield rate is increased, and the manufacturing cost is reduced.

10 Claims, 6 Drawing Sheets

US 7,976,742 B2

MANUFACTURING PROCESS FOR OPTICAL THIN FILM WITH HIGH HARDNESS MADE BY INSERT MOLD TECHNOLOGY

BACKGROUND OF THE INVENTION

The present invention relates to a plastic film and, especially, to an optical thin film made by insert mold technology and manufacturing processes thereof.

Due to the prevalence of mobile phones and notebooks, users have higher demands for housings of them. Besides requirements of styles and colors, a hardened surface for preventing scratches is also important. The hardening treatment for preventing scratches is applied on electronics such as notebooks, mobile phones, and personal digital assistants (PDA) with a colorful and smooth plastic surface made by injection molding. Besides, it can also be applied to wood panels and wheel rims.

Referring to FIG. 1, a conventional way for surface coating of a film on plastic housings is disclosed. Referring to step S100', prepare a plastic material made from polycarbonate (PC), polypropylene (PP), polymeric methyl methacrylate (PMMA), methyl methacrylate styrene copolymer (MS), acrylonitrile butadine styrene (ABS), polystyrene (PS), polyethylene terephthalate (PET), polyacetal, polyoxy Methylene (POM) or Nylon. Then, take step S110', forming shape of a housing by injection molding. Run step S120', painting various figures or colors on surface of the housing by spray coating. During the processes of spray coating, masking paint is used repeatedly to form the figures or words. Referring to step S130', spray coat transparent curable coating such as extenders or lacquer. Next, take step S140', spray coat the anti-scratch coating. Finally, run step S150', use ultraviolet curing treatment to harden the anti-scratch coating.

The method mentioned above paints various figures or colors on surface of housings by spray coating. It takes a long time to use masking paints or to attach adhesive tapes repeatedly. The processes are not only complicated but also generated pollutions and waste of paints caused by a lot of spray. Moreover, most conventional paints contain lead or other heavy metal, so that they violate regulations of Restriction of Hazardous Substance (ROHS). Also, the layer of transparent curable coating causes waste of coating, uneven distribution, and surface roughening. Furthermore, there may be piling due to turnings or curves on surface. Further, this led to a fogging problem, while the optical thin film is treated by heat or ultraviolet light, or the size is not right after being assembled.

Refer Referring to FIG. 2, manufacturing processes of an insert mold decoration technology for printing, forming, and molding of a decorated film are disclosed. Referring to step S200', provide a transparent optical thin film already being harden treated. Take the step S210', print preformed figures or colored layer under the optical thin film by direct printing or transfer printing. Refer to step S220', make the optical thin film form the required shape by hot stamping or thermal vacuum forming. Then, run the step S230', a plastic material is injected under the figures by injection molding to form a final product.

Referring to FIG. 2A, an optical thin film made by insert mold decoration (IMD) is disclosed. The optical thin film includes a figured layer 2' under the optical thin film layer 1' and a plastic material 3' disposed under the figured layer.

However, the insert mold decoration technology firstly takes the hardening treatment of the optic film and then runs the injection molding procedure. Due to increased hardness, during the following procedures such as heat treatment and injection molding, the optical thin film is easy to have cracks or wrinkles on turnings or corners. Also, it may have fogging.

SUMMARY OF THE INVENTION

Therefore, it is a primary object of the present invention to provide an optical thin film with high hardness made by insert mold technology and manufacturing processes thereof. During the steps of hot stamping or thermal vacuum forming, there are no problems of cracks, wrinkles, or fogging because the hardness of the optical thin film has not been increased. Thus, the yield rate of products is increased. Moreover, the optical thin film has a hardenable layer that is treated by UV light after forming the products, so that the hardness of the optical thin film is increased.

It is another object of the present invention to provide an optical thin film with high hardness made by insert mold technology and manufacturing processes thereof. The preformed figures or colors are printed under the optical thin film by direct printing or transfer printing. Then, the optical thin film is formed into the required shape by hot stamping or thermal vacuum forming, and a plastic substrate is injected under the optical thin film so that the required figures or colors are printed on the housing. Compared with traditional spray coating that uses shielding paints or adhesive tapes repeatedly, the present invention saves coatings.

It is another object of the present invention to provide an optical thin film with high hardness made by insert mold technology and manufacturing processes thereof that runs surface coating inside the mold before releasing the product from the mold. Thus, the steps of injection molding, surface coating and polishing are integrated into one step so as to save energy, simplify processing procedures, and reduce manufacturing cost.

In conventional IMD technology, an optical thin film is hardened in the beginning. Thus, during hot stamping or thermal vacuum processes for shaping the optical thin film, the optical thin film may generate cracks, wrinkles, or fogging due to the hardened layer, so that the yield rate is reduced. Moreover, after the housing being injection molded, figures or colors are coated on the surface thereof by spray coating. The processes of paint masking applications or tapes attachment are time-consuming and complicated. Furthermore, one more layer of hardened coating is applied. This may raise problems of coating waste, uneven distribution, and surface roughening. Also, piling happens due to turnings or curves on surface. This led to a fogging problem while the optical thin film is treated by heat or ultraviolet light, or the size is not right after being assembled.

Therefore, the present invention provides an optical thin film with high hardness made by insert mold technology and manufacturing processes thereof. A hardenable layer is formed above the optical thin film that is not hardened. Then, a figurative or colored layer is printed under the optical thin film. Later, a plastic material is injected under the figurative or colored layer by injection molding. Lastly, the hardenable layer is treated by UV light. Thus, there are no problems of cracks, wrinkles and fogging during hot stamping or thermal vacuum process. As a result, the yield rate is improved. Moreover, the figurative or colored layer is formed under the optical thin film by direct printing or transfer printing. There is no waste of paints. Furthermore, surface coating is done directly inside the mold before releasing the product from the mold. Thus, the steps of injection molding, surface coating and polishing are integrated into one step, so that energy is saved, processing procedures are simplified, and the manufacturing cost is reduced.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

During a conventional IMD technology, while taking the steps of hot stamping or thermal vacuum forming, the optical thin film has been through hardening treatment, so there may be problems of cracks, wrinkles or fogging. Thus, the present invention provides an optical thin film with high hardness made by insert mold technology and manufacturing processes thereof for improving the above disadvantages.

Figure 1:
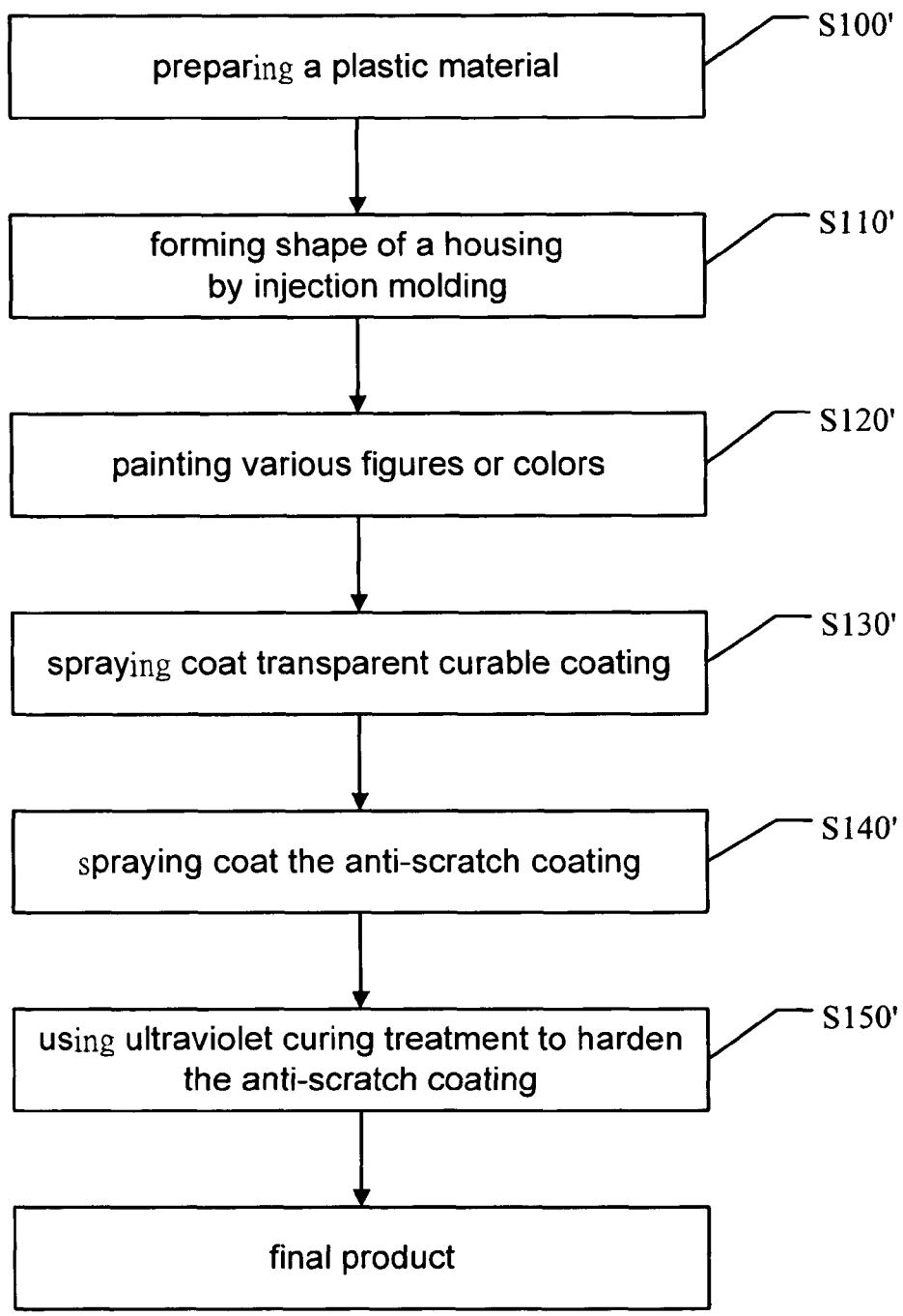
FIG. 1 is a flow chart of conventional technology for coating film on plastic housings.
Figure 2:
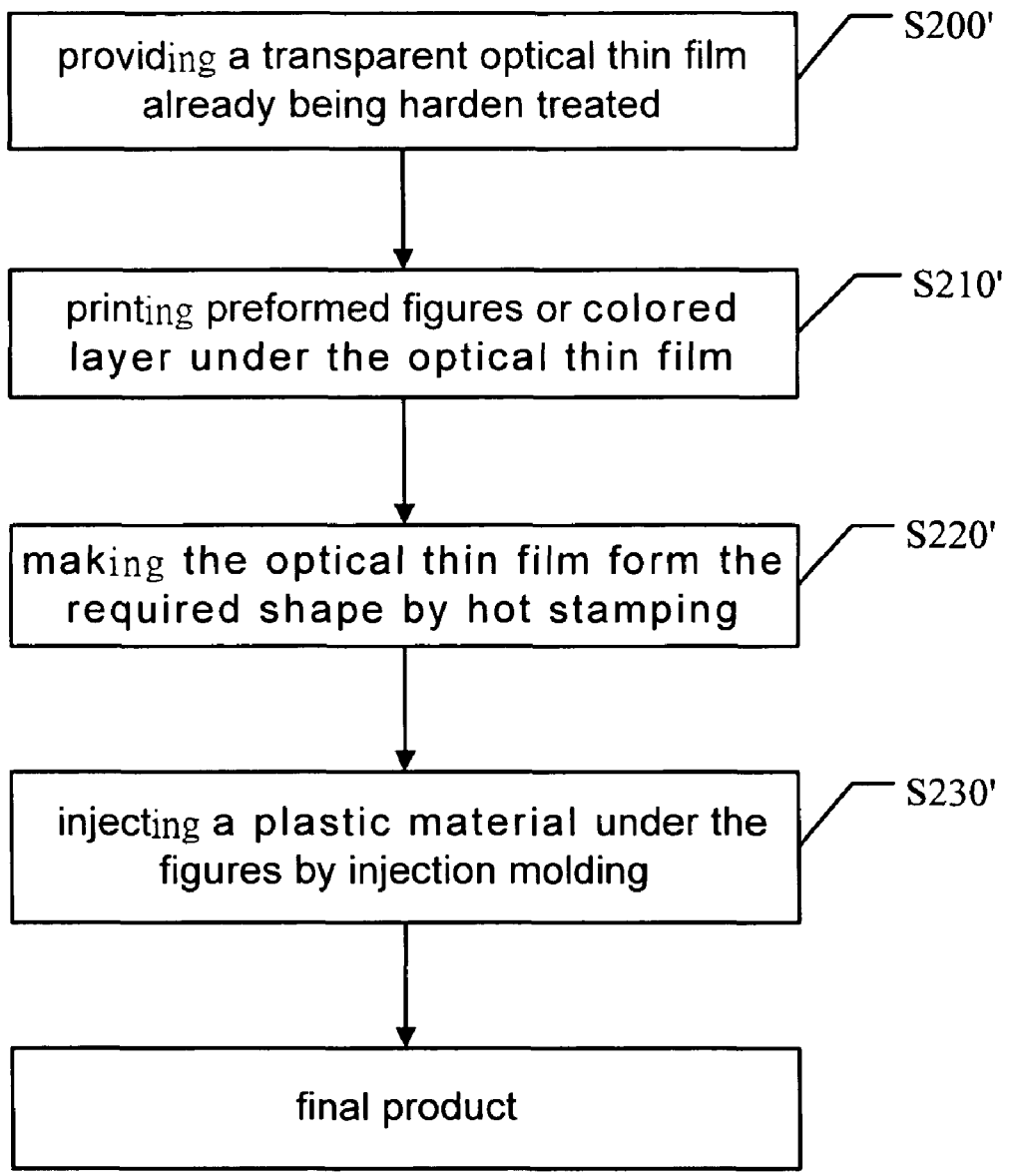
FIG. 2 is a flow chart showing manufacturing processes of conventional insert mold decoration technology.
Figure 2A:
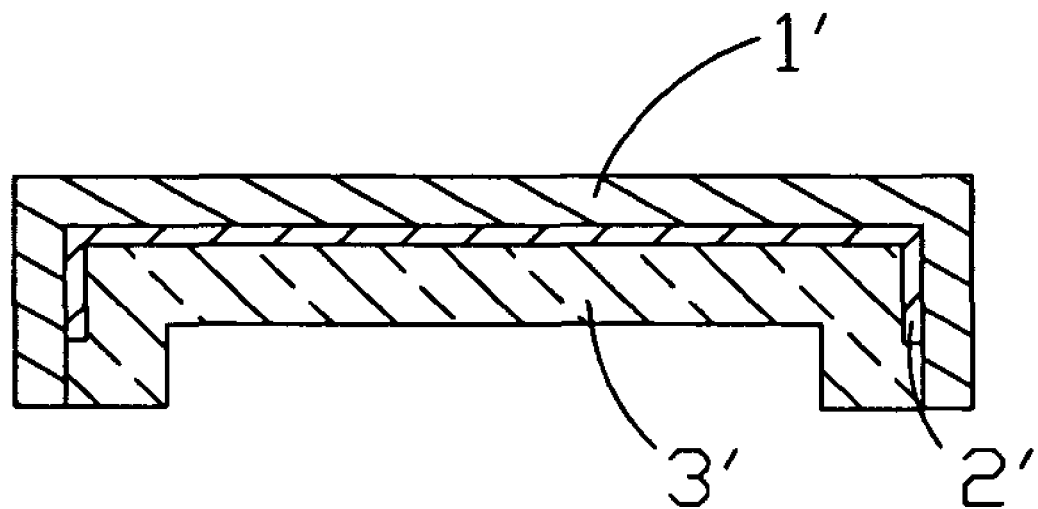
FIG. 2A is a schematic drawing showing structure of an optical thin film made by conventional insert mold decoration technology.
Figure 3:
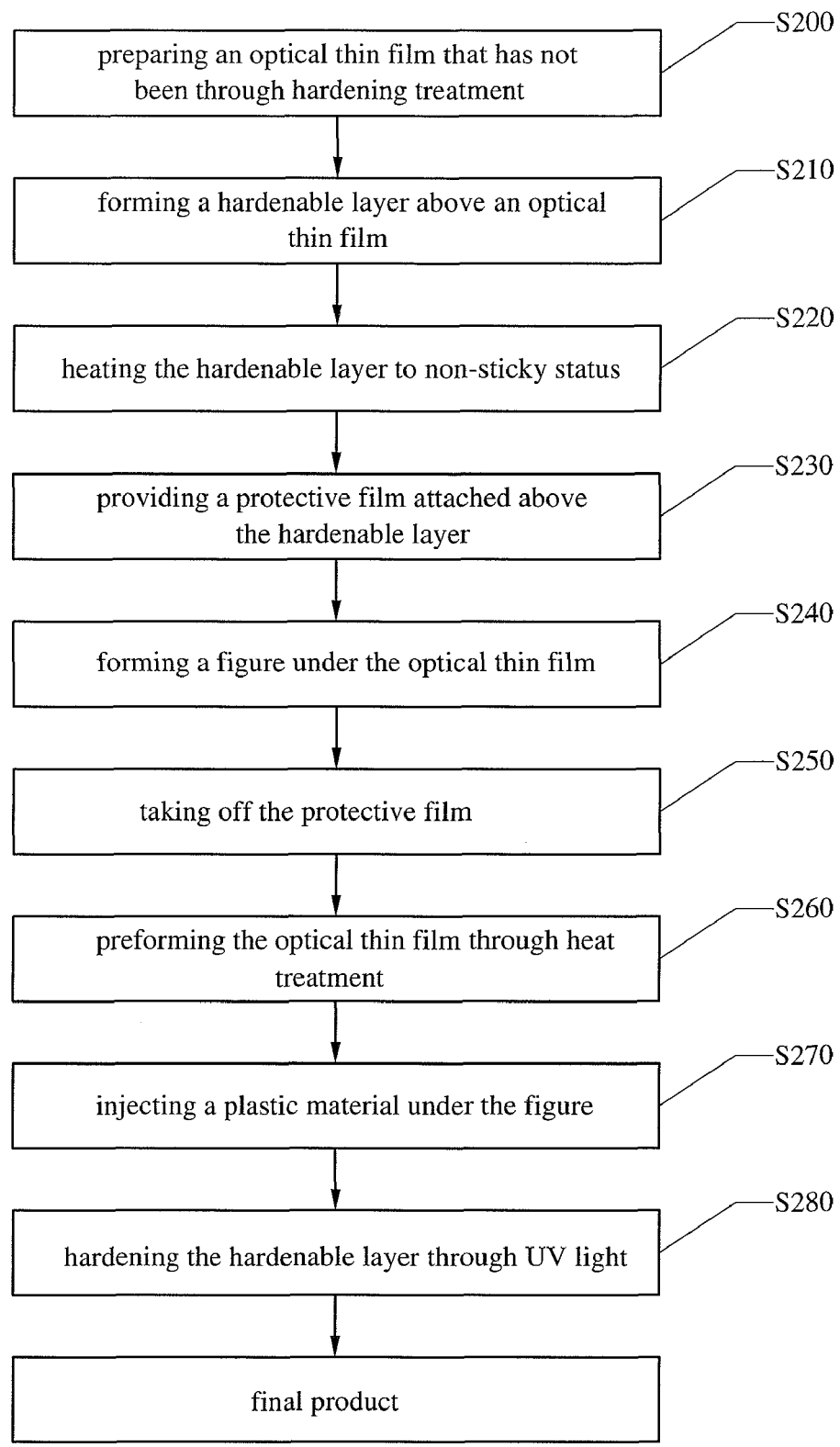
FIG. 3 is a flow chart of showing manufacturing processes of an embodiment according to the present invention with high hardness made by insert mold decoration technology.
Figure 3A:
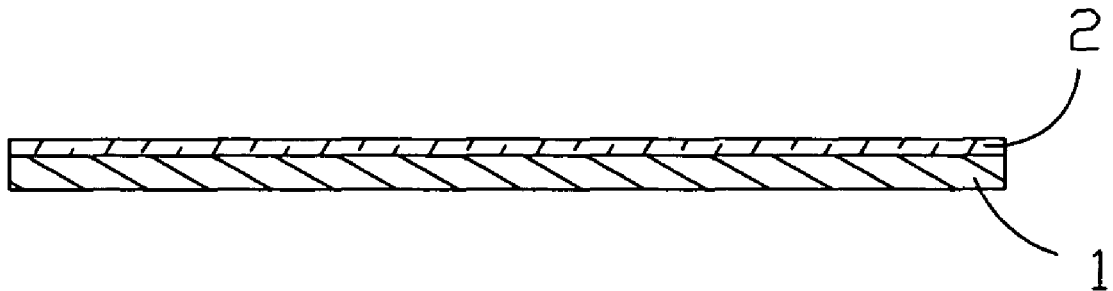
FIG. 3A is a schematic drawing showing the hardenable layer formed above the optical thin film.
Figure 3B:
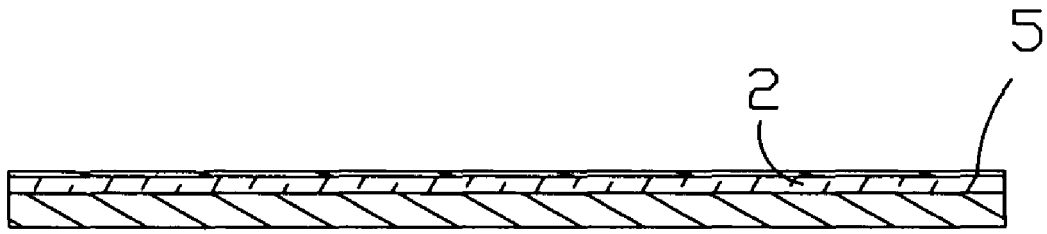
FIG. 3B is a schematic drawing showing a protective film formed above the hardenable layer.
Figure 3C:
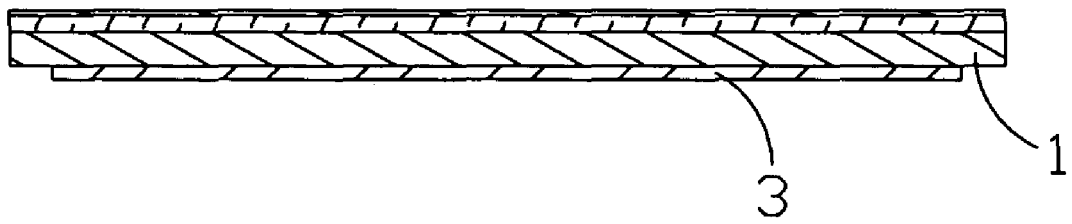
FIG. 3C is a schematic drawing showing a figure formed under the optical thin film.
Figure 3D:
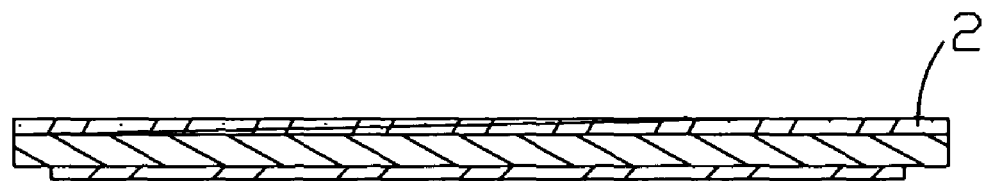
FIG. 3D is a schematic drawing showing the protective film being taken off.

Referring from FIG. 3 to FIG. 3D, in step S200, prepare an optical thin film 1 that has not been through hardening treatment. The material of the optical thin film 1 is selected from one of the following: polyethylene terephthalate (PET), polycarbonate (PC), Triacetyl Cellulose (TAC), polymeric methyl methacrylate (PMMA), methyl methacrylate styrene copolymer (MS), and cyclic olefins copolymer (COC). In this embodiment, take film made from polycarbonate as an example, the thickness of the film is 250 µm, while the grade of hardness is 2 B.

Referring to step S210, a hardenable layer 2 is formed above an optical thin film 1. As shown in FIG. 3A, a hardenable layer 2 with a thickness of 15 µm is formed above the optical thin film 1 by roll coating. The hardenable layer 2 is formed by a coating of UV curing resin that is selected from high molecular weight acrylate oligomer with a plurality of functional groups, polyurethane acrylate oligomer, monomer or combinations of them.

In step S220, heat the hardenable layer 2 to a non-sticky status. Heat the hardenable layer 2 at temperature of heat ranging from 70 to 280 Celsius degrees, more particularly 100 to 200 Celsius degrees, and preferably at 110 Celsius degrees for a time of heating ranging from 3 to 120 minutes, more preferably, 5 to 9 minutes, and preferably for 5 minutes to make the residual solvent volatilize for quick drying and to have a non-sticky status. The manufacturing time is shortened.

Referring to step S230, provide a protective film 5 attached above the hardenable layer 2. As shown in FIG. 3B, a protective film 5 is attached above the hardenable layer 2 so as to prevent contamination of the hardenable layer 2.

In step S240, a figure is formed under the optical thin film 1. Referring to FIG. 3C, the FIG. 3 is directly printed under the optical thin film 1. The FIG. 3 can be a colored layer or other forms with aesthetics appearance. Besides direct printing, transfer printing can be used.

In step S250, the protective film 5 is taken off. Referring to FIG. 3D, the protective film 5 over the hardenable layer 2 is taken off.

Figure 3E:
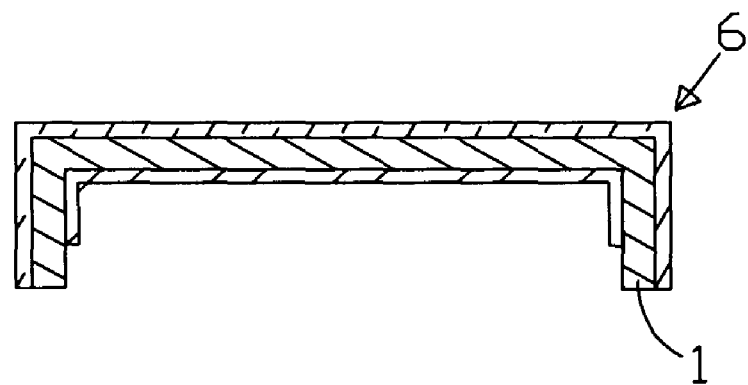
FIG. 3E is a schematic drawing showing the shaping of the optical thin film through heat treatment.

In step S260, the optical thin film 1 is pre-formed through heat treatment. Referring to FIG. 3E, the optical thin film 1 is shaped into a housing 6 of mobile phones by thermal vacuum forming and then, is moved into a mold.

Figure 3F:
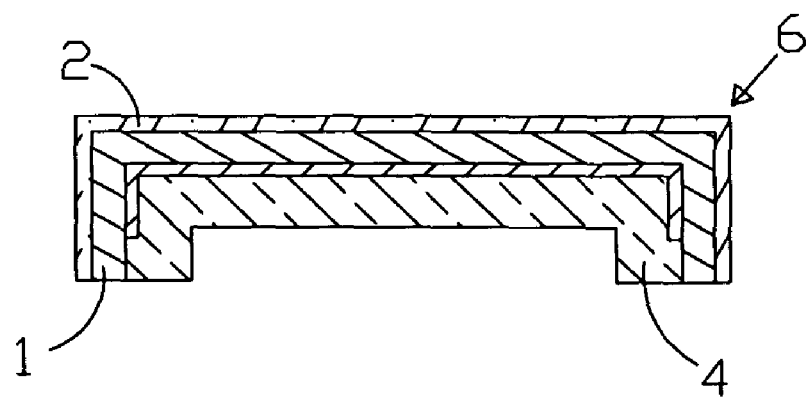
FIG. 3F is a schematic drawing showing the plastic material injected under a figure by injection molding.

In step S270, a plastic material is injected under the figure. As shown in FIG. 3F, a plastic material 4 is selected from polycarbonate (PC), polypropylene (PP), polymeric methyl methacrylate (PMMA), methyl methacrylate styrene copolymer (MS), acrylonitrile butadine styrene (ABS), polystyene (PS), polyethylene terephthalate (PET), polyacetal, polyoxy Methylene (POM) or Nylon. In this embodiment, Acrylonitrile Butadine Styrene (ABS) is placed into an injection mold, and the plastic material 4 is attached under the printed figure by injection molding. Thus, the housing 6 of mobile phones is generated by injection molding. Meanwhile, the optical thin film 1 is attached.

In step S280, the hardenable layer 2 is hardened by UV light. After the housing 6 of the mobile phone is formed by injection molding and is attached on the optical thin film 1, the hardenable layer 2 is processed by UV energy output ranging from 300 to 3000 mJ/cm$^2$, and preferably 2500 mJ/cm$^2$, so as to increase the hardness of the housing 6 of the mobile phone to grade H.

In this embodiment, the processes of heating, printing the figures and attaching the protective film are added so as to shorten the drying time, improve the appearance and avoid contamination of the hardenable layer while printing figures or colors.

In accordance with the present invention, there are various ways of coating to form the hardenable layer. For example, slot coating is where a coating liquid is pumped through a slot die at a constant rate against a web and then fills the space between the lips of the die and the web when the web moves under the die. After the web moves out the die, the fluid doesn't contact with the web, so that the coating is finished. Curtain coating is applying liquid to an object by passing the object under a thin curtain of liquid falling by gravity or pressure. The roll coating is applied by a roller and smoothed by the reverse action of the preceding roller. One of above ways is selected for coating the hardenable layer on the optical thin film.

In summary, the present invention provides an optical thin film with high hardness made by insert mold technology and manufacturing processes thereof that avoids cracks, wrinkles and fogging of the optical thin film during procedures of hot stamping or thermal vacuum forming by changing the step of hardening treatment. Also, the yield rate is increased. Moreover, the figure is formed on the housing by direct printing or transfer printing so as to save coatings. Further, the uneven distribution as well as surface roughening are prevented. There is no piling on turnings or curves of surface and no fogging after hardening treatment. Lastly, the surface coating is done inside the mold before releasing the product from the mold, so that the steps of injection molding, surface coating and polishing are integrated into one step for saving energy, simplifying processing procedures, and reducing manufacturing cost.

Additional advantages and modifications will readily occur to those skilled in the art. Therefore, the invention in its broader aspects is not limited to the specific details and representative devices shown and described herein. Accordingly, various modifications may be made without departing from the spirit or scope of the general inventive concept as defined by the appended claims and their equivalents.

What is claimed is:

1. A manufacturing process for an optical thin film with high hardness made by insert mold technology comprising:
   providing an optical thin film;
   forming a hardenable layer on the optical thin film;
   heating the hardenable layer to a non-sticky status;
   attaching a protective film on the optical thin film;
   forming a figure under the optical thin film after attaching the protective film;
   taking off the protective film after forming the figure under the optical thin film;
   pre-forming the optical thin film and hardenable layer with heat treatment;
   after pre-forming, injection molding a plastic material on the pre-formed optical thin film opposite to the hardenable layer; and
   after injection molding, hardening the hardenable layer by ultraviolet (UV) light.

2. The manufacturing process for the optical thin film as claimed in claim 1, wherein forming the figure under the pre-formed optical thin film comprises forming the figure as a color layer.

3. The manufacturing process for the optical thin film as claimed in claim 1, wherein forming the figure comprises direct printing or transfer printing.

4. The manufacturing process for the optical thin film as claimed in claim 1, wherein heating the hardenable layer comprises heating at a temperature of heating ranging from 70 Celsius degrees to 200 Celsius degrees.

5. The manufacturing process for the optical thin film as claimed in claim 1, wherein the temperature of heating is from 100 Celsius degrees to 200 Celsius degrees.

6. The manufacturing process for the optical thin film as claimed in claim 1, wherein heating the hardenable layer comprises heating for a time of heating ranging from 3 minutes to 120 minutes.

7. The manufacturing process for the optical thin film as claimed in claim 5, wherein the time of heating is from 5 minutes to 90 minutes.

8. The manufacturing process for the optical thin film as claimed in claim 1, wherein forming the hardenable layer comprises slot coating, roll coating or curtain coating.

9. The manufacturing process for the optical thin film as claimed in claim 1, wherein hardening comprises hardening by the UV light having energy output ranges from 300 mJ/cm$^2$ to 3000 mJ/cm$^2$.

10. The manufacturing process for the optical thin film as claimed in claim 1, wherein the heat treatment includes hot stamping or thermal vacuum.

* * * * *